Nov. 14, 1950 — J. WOLF — 2,529,646
COMBINATION CHAIN SAW SERVICING TOOL
Filed July 8, 1949 — 2 Sheets-Sheet 1
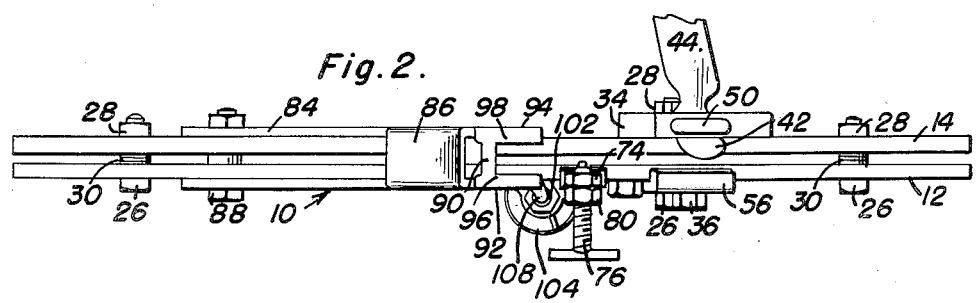
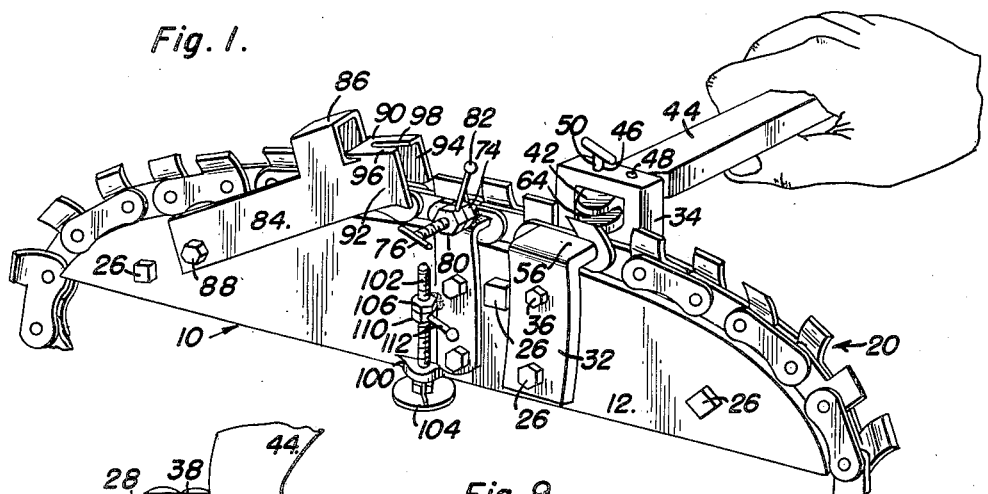
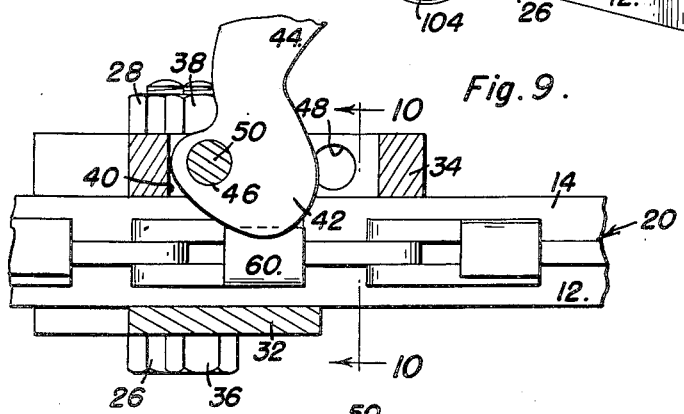
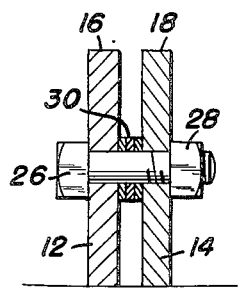
Inventor
Joseph Wolf Nov. 14, 1950  J. WOLF  2,529,646
COMBINATION CHAIN SAW SERVICING TOOL
Filed July 8, 1949  2 Sheets-Sheet 2
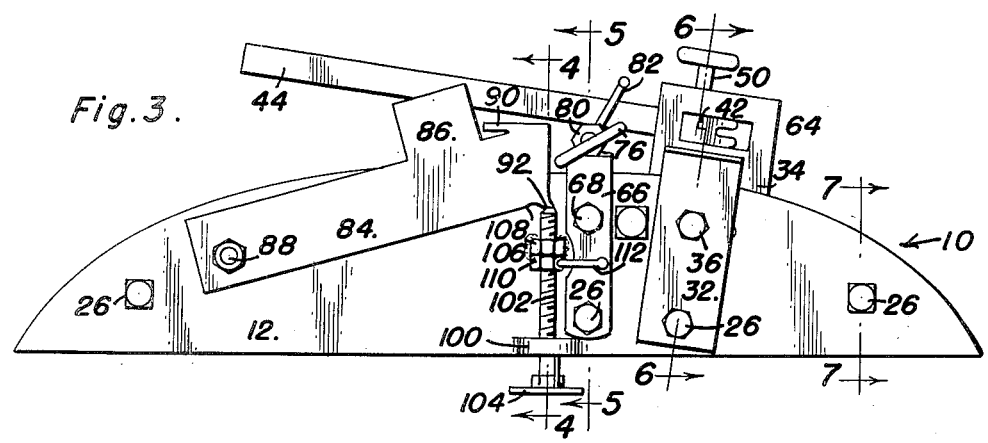
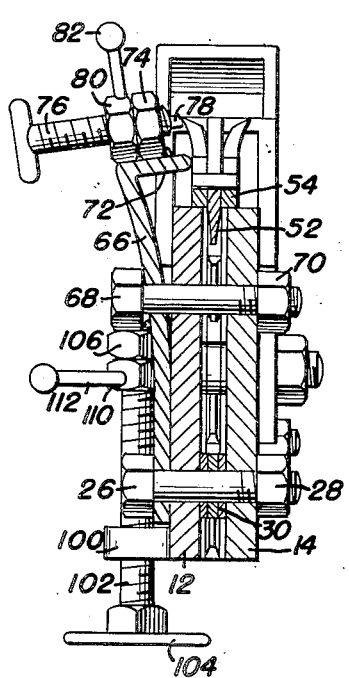
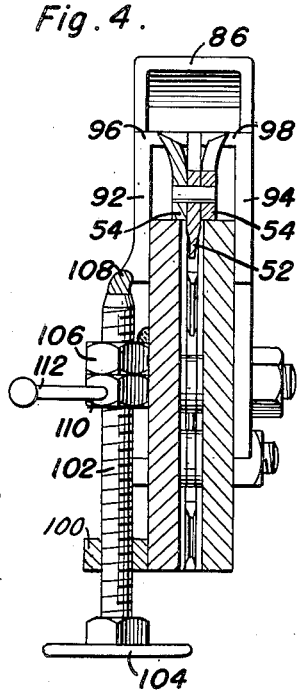
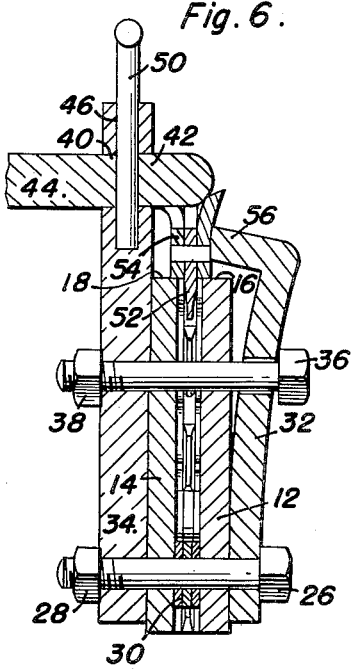
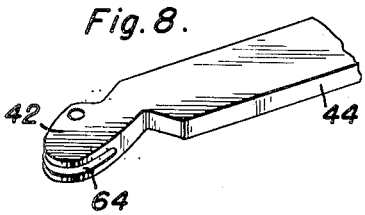
Inventor
Joseph Wolf Patented Nov. 14, 1950

2,529,646

UNITED STATES PATENT OFFICE 2,529,646

COMBINATION CHAIN SAW SERVICING TOOL

Joseph Wolf, Hood River, Oreg.

Application July 8, 1949, Serial No. 103,627

6 Claims. (Cl. 76—63)

This invention relates to new and useful improvements in saw gauging tools and the primary object of the present invention is to provide a device having the necessary tools attached thereto for the gauging and setting of all the various type teeth of a chain saw such as a standard tooth chain saw, the chisel bit, chipper or R-type chain saw.

Another very important object of the present invention is to provide a combination chain saw-servicing tool including a pair of adjustably connected clamping plates for use with chain saws of various widths, said clamping plates having arcuate guide edges on which the lower edges of the saw teeth are supported.

Another object of the present invention is to provide a chain saw servicing tool including a spring member for holding a chain saw in position for servicing and an adjustable feeler gauge supported on the spring member for gauging the cutting teeth of a chain saw.

Yet another object of the present invention is the provision of a combination chain saw servicing tool including a jointing gauge and embodying a novel and improved adjustable support for the jointing gauge.

A further object of the present invention is to provide a combination chain saw servicing tool that is extremely small and compact in structure and which is quickly and readily assembled, disassembled or adjusted in a convenient manner.

A still further aim of the present invention is to provide a tool of the aforementioned character that is simple and practical in construction, strong and reliable in use, efficient and durable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present tool in use for setting a tooth of a chain saw;

Figure 2 is a top plan view of the present tool;

Figure 3 is a front elevational view of the present invention;

Figure 4 is an enlarged transverse vertical sectional view taken substantially on the plane of section line 4—4 of Figure 3 and showing the jointing gauge in use;

Figure 5 is an enlarged transverse vertical sectional view taken substantially on the plane of section line 5—5 of Figure 3 and showing the feeler gauge in use;

Figure 6 is an enlarged transverse sectional view taken substantially on the plane of section line 6—6 of Figure 3 and showing the setting lever in use;

Figure 7 is an enlarged transverse vertical sectional view taken substantially on the plane of section line 7—7 of Figure 3;

Figure 8 is a fragmentary perspective view of the setting lever used in conjunction with the present invention;

Figure 9 is an enlarged fragmentary top plan view of the present invention and with parts broken away to illustrate the setting gauge in use; and Figure 10 is a transverse vertical sectional view taken substantially on the plane of section line 10—10 of Figure 9.

Referring now to the drawings in detail, wherein for the purpose of illustration, there is disclosed a preferred embodiment of the present invention, the numeral 10 represents the present combination chain saw servicing tool generally, including a pair of clamping plates 12 and 14 having arcuate upper edges 16 and 18 forming guide surfaces for a chain saw 20.

The clamping plates 12 and 14 are provided with registering openings 22 and 24 that receive bolts 26 on which there are threaded nuts 28. Any suitable number of washers 30 are received on the bolts 26 and are interposed between the clamping plates 12 and 14 to space the clamping plates from each other a predetermined distance, depending upon the width chain saw that is to be serviced.

One of the bolts 26 extends through the longer leg of a substantially L-shaped spring member 32 and also the lower portion of a supporting wall 34. A further bolt 36, spaced above and parallel to the bolt 26 securing the member 32 and the wall 34 to the clamping plates 12 and 14, extends through the member 32, the plates 12 and 14, and the wall 34 and a nut 38 is threaded on the bolt 36.

The supporting wall 34 is provided with a substantially rectangular slot 40 above the edges 16 and 18 of the plates 12 and 14 that receives one end 42 of a saw tooth setting lever 44. A pair of spaced parallel substantially vertical blind bores 46 and 48 intersect the slot 40 and a selected one of these bores receives a removable pivot pin 50.

In practical use of the saw tooth setting lever 44, the lower edge 52 of the chain saw 20 is received between the clamping plates 12 and 14 so that the lower edges of the saw teeth 54 will be supported upon the surfaces 16 and 18. The shorter leg 56 of the member 32 will yieldingly urge the lower edges of the saw teeth 54 against the surfaces 16 and 18 of the plates 12 and 14 so that the teeth being set will be held against lateral movement as the lever 44 is pivoted (see Figure 6).

Attention is now directed to Figure 5 wherein there is disclosed the feeler gauge that is used in conjunction with the present invention. One of the bolts 26 extends through the longer leg of a substantially L-shaped resilient guide and holding member 66. A further bolt 68, spaced parallel to the bolt attaching the member 66 and the plates 12 and 14, extends through the member 66 and the plates 12 and 14, and a nut 70 is threaded on the bolt 68. The shorter leg 72 of the member 66 yieldingly urges the lower edges of the teeth 54 being gauged against the surfaces 16 and 18.

A lug 74 is fixed by welding or the like to the shorter leg 72 of the member 66 and includes a threaded opening that receivably engages a screw or bolt 76 the inner end of which supports a bearing lug 78. A lock nut 80 is threaded on the bolt 76 and supports a laterally projecting finger grip 82. The lock nut 80 abuts the lug 74 to retain the bolt 76 in a selected adjusted position.

Reference is next directed to Figures 1, 3 and 4 wherein there is disclosed the jointing gauge used in conjunction with the present invention. The elongated leg portions 84 of a channel member 86 are pivotally secured to the clamping plates 12 and 14 by a fastener 88. A further channel member 90 formed with the aforementioned channel member 86 is provided with a slot in its web defining a pair of arms 92 and 94 having inturned edges 96 and 98 between which the cutting edges of a pair of opposed and joined teeth 54 are disposed to bear against the edges 96 and 98. The upper surfaces of the edges 96 and 98 are flat and co-planar whereby a file may rest thereupon for filing down any portion of the teeth 54 that project above the said upper flat surfaces.

Means is provided for supporting and stopping the swinging movement of the member 90 in one direction, and this means comprises an ear 100 projecting outwardly from the plate 12 in which there is threaded a rod or bolt 102 having a hand wheel 104 on its lower end. A lug 106 fixed by welding or the like to the plate 12 directly above the ear 100 and includes a threaded aperture that receivably engages the rod 102 and the upper end of the rod 102 bears against a lug or lip 108 on the arm 92.

A lock nut 110 threaded on the rod 102, and bearing against the nut 106, is provided with a laterally projecting finger grip 112 for use in retaining the rod 102 adjusted.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A combination chain saw servicing tool comprising a pair of vertically disposed clamping plates, means adjustably connecting the clamping plates, a horizontally swingable saw tooth setting member mounted on the clamping plates and overlying the upper edges of both clamping plates, means for retaining a selected saw tooth of a chain saw in position to the setting member, a feeler gauge mounted on the clamping plates and disposed adjacent the setting member, a raker tooth gauge pivoted to said clamping plates for vertical swinging movement, and an adjustable support and stop for said raker tooth gauge, said adjustable support and stop being carried by one of the clamping plates and limiting pivotal movement of said raker tooth gauge toward said clamping plates.

2. The combination of claim 1, wherein said saw tooth setting member includes a lever having a slot therein, said slot having a cam surface adapted to bear against the outturned portion of a saw tooth.

3. The combination of claim 1, wherein said means for retaining a selected saw tooth of a chain saw in position to the setting member includes an L-shaped spring member, and means detachably securing the longer leg of said L-shaped spring member to the clamping plates.

4. A combination chain saw servicing tool comprising a pair of vertically disposed clamping plates, means adjustably connecting the clamping plates, a horizontally positioned saw tooth setting member swingably mounted on the clamping plates and overlying the upper edges of said clamping plates, means for retaining a selected saw tooth of a chain saw in position to the setting member, a feeler gauge mounted on the clamping plates and disposed adjacent the setting member, a channel-shaped raker tooth gauge pivoted to said clamping plates for vertical swinging movement, a pair of spaced gauge arms carried by said channel-shaped raker tooth gauge and spaced sufficiently to receive a pair of opposing and joined raker teeth of a chain saw, said arms having upper co-planar and flat surfaces adapted to receive a file for removing the parts of a raker tooth that projects above the flat surfaces of said arms, and an adjustable support and stop for said channel-shaped raker tooth gauge limiting downward swinging movement of said channel-shaped raker tooth gauge.

5. A combination chain saw servicing tool comprising a pair of vertically disposed clamping plates, means adjustably connecting the clamping plates, a horizontally rotatable saw tooth setting member swingably mounted on and overlying the clamping plates, resilient means mounted on one of the plates for retaining a selected saw tooth of a chain saw in position to the setting member, a feeler gauge mounted on the clamping plates and disposed adjacent the setting member, a channel-shaped raker tooth gauge pivoted to said clamping plates and straddling the clamping plates, a pair of spaced gauge arms carried by said channel-shaped raker tooth gauge and spaced sufficiently to receive a pair of opposing and joined raker teeth of a chain saw, said arms having upper co-planar and flat surfaces adapted to receive a file for removing the parts of a raker tooth that projects above the flat surfaces of said arms, a lug fixed to one of said clamping plates, a screw threaded in said lug, a finger grip on one end of said screw, another lug on one of said arms supported on said screw, and a lock nut threaded on said screw and abutting the first-mentioned lug.

6. A combination chain saw servicing tool comprising a pair of clamping plates, means adjustably connecting the clamping plates, a saw tooth setting member swingably mounted on the clamping plates, means for retaining a selected saw tooth of a chain saw in position to the setting member, a feeler gauge mounted on the clamping plates and disposed adjacent the setting member, a raker tooth gauge pivoted to said clamping plates, and an adjustable support and stop for said raker tooth gauge, said adjustable support and stop being carried by one of the clamping plates, said feeler gauge including a substantially L-shaped resilient member having its longer leg fixed to said clamping plates, a lug fixed to the shorter leg of said L-shaped resilient member and a screw threaded in said lug.

JOSEPH WOLF.

REFERENCES CITED

The following references are of record in the file of this patent:

UNITED STATES PATENTS

| Number | Name | Date |
| --- | --- | --- |
| 2,392,563 | Wilson | Jan. 8, 1946 |
| 2,422,871 | Wilson | June 24, 1947 |